US011036943B2

(12) United States Patent
Vernica et al.

(10) Patent No.: US 11,036,943 B2
(45) Date of Patent: Jun. 15, 2021

(54) IMAGING WITH JOB TICKET

(71) Applicant: Hewlett-Packard Development Company, L.P., Spring, TX (US)

(72) Inventors: Rares Vernica, Palo Alto, CA (US); Omer Gila, Palo Alto, CA (US); Henryk Birecki, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/629,985

(22) PCT Filed: Jul. 24, 2017

(86) PCT No.: PCT/US2017/043492
§ 371 (c)(1),
(2) Date: Jan. 10, 2020

(87) PCT Pub. No.: WO2019/022701
PCT Pub. Date: Jan. 31, 2019

(65) Prior Publication Data
US 2020/0151411 A1  May 14, 2020

(51) Int. Cl.
G06K 19/00 (2006.01)
G06K 7/10 (2006.01)
G06K 7/08 (2006.01)
G06K 7/14 (2006.01)
G06K 19/06 (2006.01)

(52) U.S. Cl.
CPC ......... G06K 7/10722 (2013.01); G06K 7/087 (2013.01); G06K 7/1413 (2013.01); G06K 19/06028 (2013.01); G06K 19/06187 (2013.01)

(58) Field of Classification Search
CPC .. G06K 7/10722; G06K 7/087; G06K 7/1413; G06K 19/06028; G06K 19/06187; G06K 10/06311; G06K 10/103; G06K 19/06018; G06K 19/077; G06K 19/0615
See application file for complete search history.

(56) References Cited

U.S. PATENT DOCUMENTS

| 5,866,284 | A  | 2/1999  | Vincent           |
| 6,271,926 | B1 | 8/2001  | Jacobs            |
| 6,333,754 | B1 | 12/2001 | Oba               |
| 6,515,790 | B2 | 2/2003  | Miyamoto          |
| 6,982,734 | B2 | 1/2006  | Pan               |
| 7,140,550 | B2 | 11/2006 | Ramachandran      |
| 7,580,845 | B2 | 8/2009  | Burman            |
| 8,117,617 | B2 | 2/2012  | Fernstrom et al.  |

(Continued)

OTHER PUBLICATIONS

Buckwalter, Claes. INFLOW: Structured Print Job Delivery. Institutionen för teknik och naturvetenskap, 2003. < https://www.diva-portal.org/smash/get/diva2:20149/FULLTEXT01.pdf >.

Primary Examiner — Matthew Mikels
(74) Attorney, Agent, or Firm — Dicke Billig & Czaja PLLC

(57) ABSTRACT

A device includes an imager and a control portion. The imager is to selectively image media as an imaging job in association with a job ticket. The control portion is to at least receive a unique ID associated with the media and, based on the unique ID, to at least partially determine the job ticket and to at least partially determine a scope of content of the imaging job.

15 Claims, 6 Drawing Sheets

(56) References Cited

U.S. PATENT DOCUMENTS

| | | |
|---|---|---|
| 8,144,388 B2 | 3/2012 | Ogawa |
| 8,174,712 B2 | 5/2012 | Richardson et al. |
| 8,514,256 B2 | 8/2013 | Ogawa |
| 8,665,461 B2 | 3/2014 | Salgado |
| 8,760,691 B2 | 6/2014 | Giannetti |
| 8,786,883 B2 | 7/2014 | Hoarau |
| 8,830,160 B2 | 9/2014 | Gila |
| 8,848,220 B2 | 9/2014 | Giannetti |
| 8,885,189 B2 | 11/2014 | Armstrong |
| 9,473,760 B2 | 10/2016 | Buser et al. |
| 2002/0194425 A1 | 12/2002 | Penchuk |
| 2003/0067427 A1 | 4/2003 | Comiskey |
| 2005/0134550 A1 | 6/2005 | Schmitz |
| 2006/0017659 A1 | 1/2006 | Ogawa |
| 2007/0045399 A1 | 3/2007 | Martin |
| 2011/0226859 A1 | 9/2011 | Chen et al. |
| 2011/0298760 A1 | 12/2011 | Gila |
| 2012/0206341 A1 | 8/2012 | Gila |
| 2012/0229440 A1 | 9/2012 | Rao et al. |
| 2012/0320001 A1 | 12/2012 | Gila |
| 2013/0003162 A1 | 1/2013 | Leoni |
| 2013/0235446 A1 | 9/2013 | Leoni |
| 2014/0210805 A1 | 7/2014 | Birecki |
| 2014/0239068 A1 | 8/2014 | Park |
| 2014/0253426 A1 | 9/2014 | Leoni |
| 2016/0342064 A1 | 11/2016 | Gila et al. |
| 2016/0379426 A1* | 12/2016 | Tholen ............... G07C 9/21 340/5.21 |

\* cited by examiner

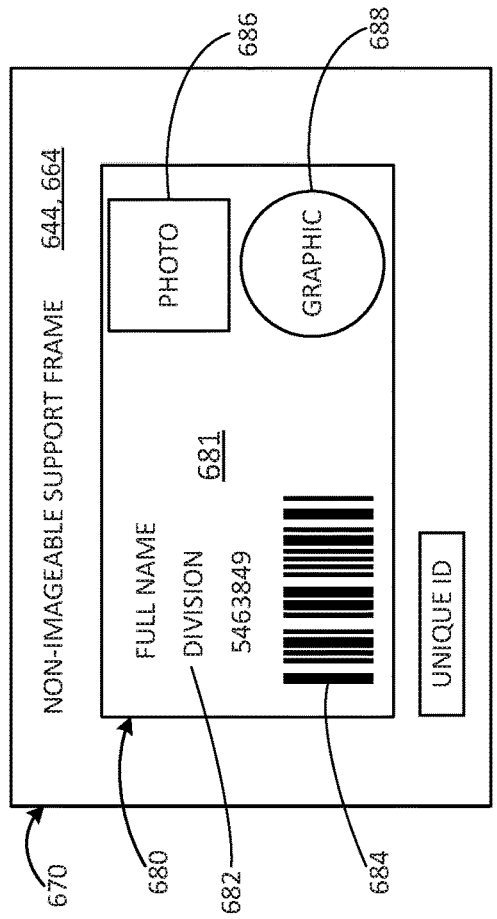
FIG. 11
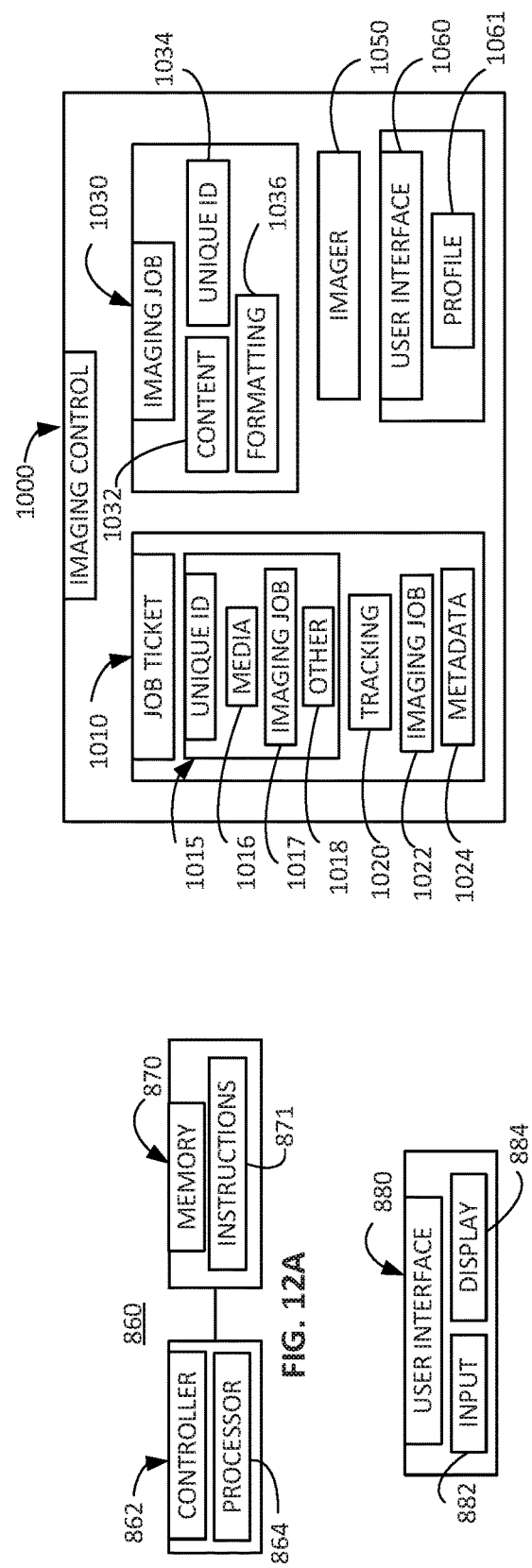
FIG. 13
FIG. 12A
FIG. 12B

IMAGING WITH JOB TICKET

BACKGROUND

Via various types of media and various types of imaging, information may be communicated in a wide variety of ways. In some instances, such imaging may be performed in association with a job ticket.

BRIEF DESCRIPTION OF THE DRAWINGS

FIG. 11 is a top plan view schematically representing an example passive e-paper media.

FIGS. 12A and 12B are a block diagram schematically representing an example control portion and an example user interface, respectively.

FIG. 13 is a block diagram schematically representing an imaging control engine.

DETAILED DESCRIPTION

Figure 1A:
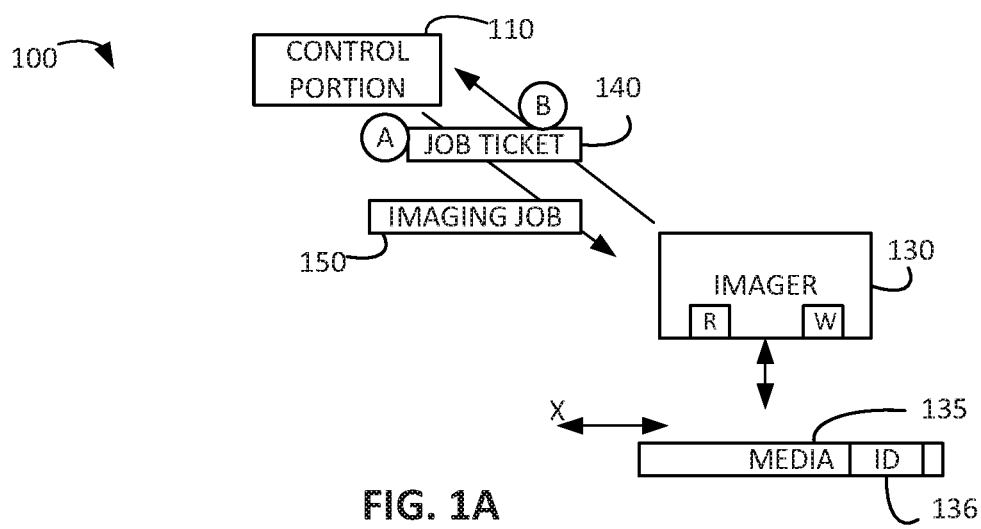
FIG. 1A is a block diagram schematically representing an example imaging system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples are directed to using a job ticket in a dynamic manner in which the job ticket may be modified during an imaging job, in response to changed content, as part of a feedback mechanism during or after the imaging job, etc.

In some examples, a device comprises an imager and a control portion. In some such examples, the imager is to selectively image media as an imaging job in association with a job ticket. In some such examples, the control portion is to at least receive a unique ID (e.g. unique identifier) associated with the media and, based on the unique ID, to at least partially determine the job ticket and to at least partially determine a scope of content of the imaging job.

In some examples, the unique ID may comprise at least one alphanumeric string and/or two-dimensional pattern, either of which may in some instances be embodied in a machine readable/writable format. In some examples, in addition to, or instead of, alphabetic letters, numbers, etc., the unique ID may comprise symbols, special characters, markings, punctuation elements, etc. For instance, in just one example, the unique ID may comprise high-density symbology expressable via at least bar codes (e.g. machine readable elements). In some such examples, the high-density symbology may comprise Code 128, which may comprise Code 128A, 128B, or 128C. While a wide range of permutations of Code 128 may be used in at least some examples of the present disclosure, in at least some examples the Code 128 may be implemented via the Uniform Symbology Specification (USS) Code 128 or the International Symbology Specification Code 128 (ISS).

In some examples, the device comprises a user interface, in association with at least the control portion, to receive user-provided information to at least partially determine the content of the imaging job. In some such examples, via communication between the user interface and the control portion, the control portion is to update the job ticket regarding the content of the imaging job in association with the user-provided information.

Among other uses, such updating of the job ticket facilitates continued or on-going use of a media beyond the first or current imaging job while also collecting and leveraging metadata (e.g. user information, imager performance information, media information, user interface information, etc.) generated in association with the imaging job. In this way, such example job tickets may dynamically expand the range of types of uses for media (e.g. rewritable media), may provide for more robust use of such media, may enhance imager usage and performance, may enhance user interface performance/interactions, etc. At least some of these example arrangements may stand in contrast to an ordinary job ticket, which generally terminates upon execution of a printing job.

In some examples, in response to receiving the unique ID, the control portion is to at least partially determine a user interaction profile at the user interface by which the user-provided information is received. In some such examples, the particular screens, workflow, available data fields, etc. available to a particular user may be driven by the control portion according to the particular received unique ID and/or type of media associated with such unique IDs. In some examples, the control portion may maintain in a database or other memory resource a library of unique IDs and the associated user interaction profile (and/or media type profile) with each unique ID. Via such example arrangements, the experience of different users at a user interface may vary widely depending upon a particular user interaction profile associated with a unique ID assigned to that user and/or a particular media item.

In some examples, the media may comprise a rewritable media. In some examples, the unique ID of the media item may be selectively changed. In some examples, the rewritable media may comprise a passive e-paper media and/or the imager may comprise an ion-emitting unit to erase and/or write to the passive e-paper media in a non-contact manner. In some examples, the unique ID may form at least part of a rewritable image on the passive e-paper media and/or may form part of (e.g. be provided on) a non-rewritable support frame for the passive e-paper media.

It will be understood that a media may sometimes be referred to as a media item to indicate that media refers to a particular physical item rather than generically referring to a type of media or a supply of media.

These examples, and additional examples, will be described in association with at least FIGS. 1A-14.

FIG. 1A is a block diagram schematically representing an example imaging device 100. In some examples, device 100 comprises a control portion 110 and an imager 130. In some examples, the imager 130 is to selectively image media 135 as an imaging job 150 in association with a job ticket 140. As represented via identifier A in FIG. 1A, in some examples the job ticket 140 and imaging job 150 may be directed from control portion 110 to imager 130. However, it will be understood that in at least some examples an intention to initiate the imaging job 150 may first be communicated to the control portion 110 via a user interface (e.g. 120 in FIGS. 1B-2C), which may receive such a request in the form of an email, administrator command, automated process, etc. Such requests may originate from an employee, visitor, manager, security, consumer, etc.

In some examples, the control portion 110 is to at least receive a unique ID 136 associated with the media 135 (as represented via indicator B) and, based on the unique ID 136, to at least partially determine the job ticket 140 and to at least partially determine a scope of content of the imaging job 150. It will be understood that in at least some examples, the indicator B may generally represent other/additional communications from imager 130 to control portion 110. In some such examples, the job ticket 140 and/or imaging job 150 may be at least partially determined via establishing, updating, adding, removing, modifying, replacing, confirming, and/or validating at least some information in the job ticket 140 and/or imaging job 150, respectively. In some examples, the unique ID 136 may be obtained from media 135 via a read portion (R) of imager 130. In some examples, a separate feeder and/or a portion of the imager 130 may automatically cause feeding of the media 135 relative to at least the read portion (R) of imager 130, while in some examples, a media 135 may be manually fed to at least the reader portion (R) of the imager 135. In some examples, the unique ID 136 also may be known to or accessible via control portion 110 in association with a memory resource, whether cloud-based or locally.

In some examples, in response to receiving the unique ID as described in association with FIG. 1A, the control portion 110 is to at least partially determine a user interaction profile for use at a user interface (e.g. 120 in FIGS. 1A, 2A-2C) by which the user-provided information is received. In some examples, the user interaction profile may specify the types of information (e.g. name, position, company, photo, etc.) to form part of imaging job, the types of media, the types of imaging, etc. which are permissible for the particular user for which a media may be imaged. Accordingly, when presented with prompts via user interface according to such a profile, a user may enter information which may form at least some of the content of the imaging job 150 and become part of the job ticket 140.

In some examples, the user interaction profile may be implemented per a user interaction profile parameter 1061 of imaging control engine 1000 as later described in association with at least FIG. 13.

It will be understood that the term "device" as used in the present disclosure may comprise several portions working in cooperation whether such components are permanently connected, removably connected, or permanently separate from each other. Accordingly, in some examples a device may comprise a single station having multiple portions (e.g. imager, user interface, etc.), in some examples, a device may comprise an arrangement of multiple separable pieces (e.g. imager, user interface, etc.) which may function in a complementary manner whether they are in close proximity or remotely locatable from each other.

In some examples, control portion 110 may be implemented via at least some of substantially the same features and attributes as control portion 860, as later described in association with at least FIG. 12A.

Figure 1B:
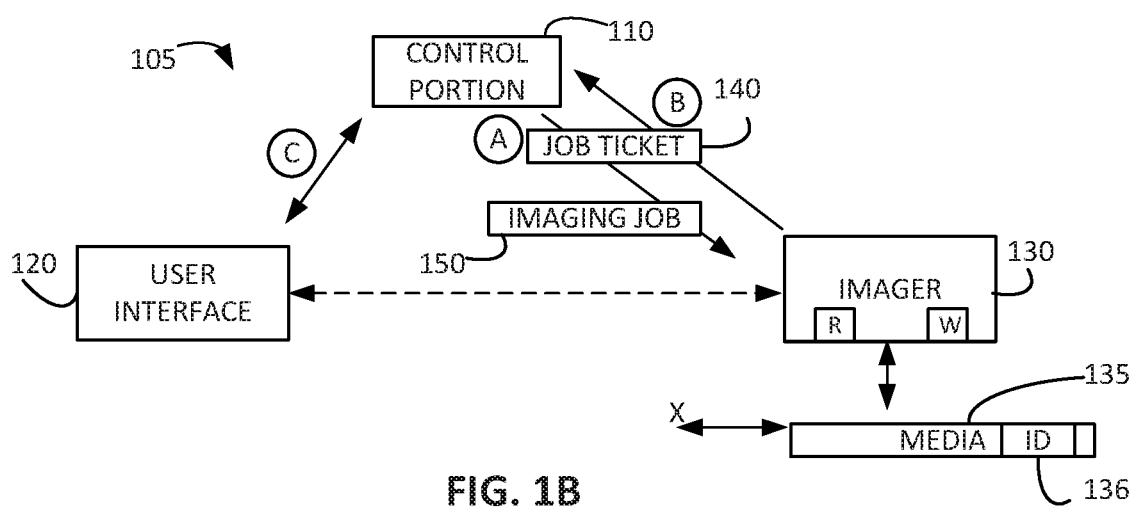
FIG. 1B is a block diagram schematically representing an example imaging system.

FIG. 1B is a block diagram schematically representing an example device 105. In some examples, device 105 comprises at least some of substantially the same features and attributes as device 100 of FIG. 1A, except further comprising a user interface 120. In some examples, the user interface 120, in association with at least the control portion 110, is to receive user-provided information to at least partially determine the content of the imaging job 150. In particular, via communication between at least the user interface 120 and the control portion 110 (as represented via indicator C), the control portion 110 is to update the job ticket 140 regarding the content of the imaging job 150 in association with the user-provided information.

Figure 2A:
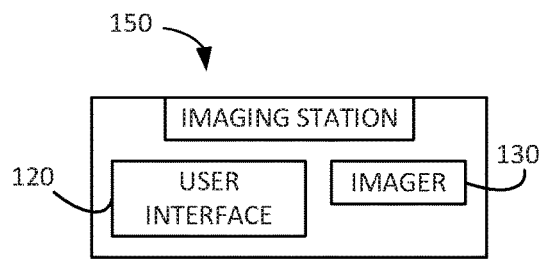
FIG. 2A is a block diagram schematically representing an example imaging station.
Figure 2B:
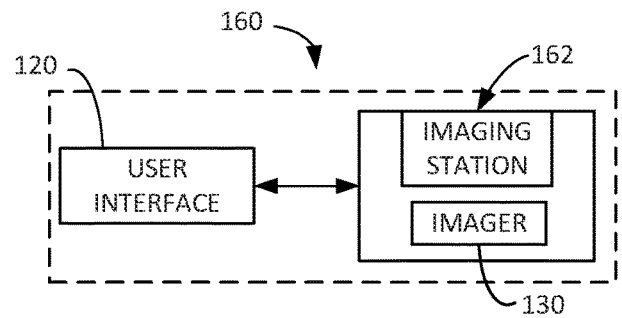
FIG. 2B is a block diagram schematically representing an example imager portion.
Figure 2C:
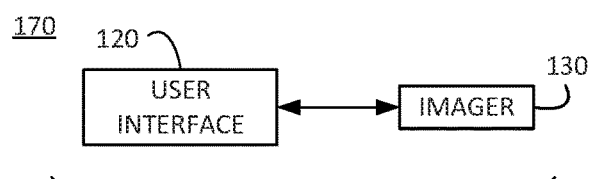
FIG. 2C is a block diagram schematically representing an example imager portion.

FIGS. 2A-2C provide at least some example configurations in which user interface 120 and imager 130 related to each other. In some examples, the user interface 120 and/or imager 130 in FIGS. 2A-3C may comprise at least some of substantially the same features and attributes as user interface 120 and/or imager 130 of FIG. 1A-1B.

FIG. 2A is a block diagram schematically representing an example imaging station 150 in which the user interface 120 and imager 130 form part of a single imaging station such that the user interface 120 may be considered to be co-located with each other, such that a user's interactions with user interface occur in close proximity to imager 130.

FIG. 2B is a block diagram schematically representing an example imager portion 160 in which user interface 120 and imager 130 are in selectable proximity to each other, such as when user interface 120 may be mobile, portable or reasonably accessible near imager 130.

FIG. 2C is a block diagram schematically representing an example imager portion 170 in which user interface 120 is located remotely from imager 130 and user interface 120 may be stationary, mobile, portable or reasonably accessible near imager 130.

Figure 3:
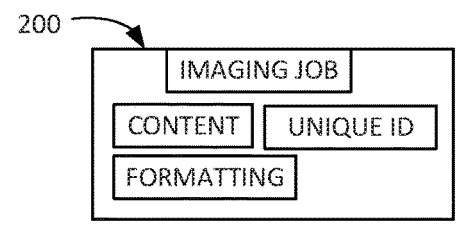
FIG. 3 is a block diagram schematically representing an example imaging job.

FIG. 3 is a block diagram schematically representing an example imaging job 200, which may comprise one example implementation of the imaging job 150 in FIGS. 1A-1B. As shown in FIG. 3, imaging job 200 comprises content 202, formatting 204, and imaging job unique ID 206. As noted later, in some examples this unique ID 206 (e.g. unique ID 136 in FIGS. 1A, 1B) may form part of or be imaged onto a media, such as media 135.

Figure 4:
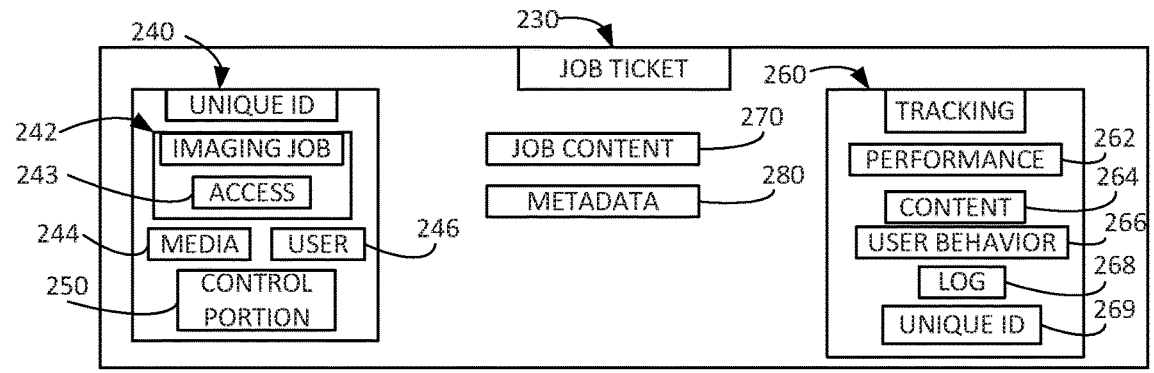
FIG. 4 is a block diagram schematically representing an example job ticket.

FIG. 4 is a block diagram schematically representing an example job ticket 230, which may comprise one example implementation of the job ticket 140 in FIGS. 1A, 1B. As shown in FIG. 4, the job ticket 230 may comprise a unique ID portion 240, a tracking portion 260, job content portion 270, and metadata portion 280. In some examples, the unique ID portion 240 may comprise an imaging job element 242, media element 244, user element 246, and/or a control portion element 250.

In some examples, the imaging job element 242 of unique ID portion 240 specifies a unique ID (e.g. 136 in FIGS. 1A-1B, 206 in FIG. 3) for imaging job 200. In some examples, the job ticket 230 may comprise a plurality of imaging jobs 200, each having a specified unique ID per element 242. In some examples, the imaging job element 242 may comprise an access parameter 243 to provide access to the imaging job(s) 200 (FIG. 3) via a link to a cloud resource, a storage medium, etc.

In some examples, the media element 244 of unique ID portion 240 uniquely specifies a particular media (e.g. a media item) for imaging job 200. It will be understood that in at least this context the term media refers to a particular physical media item, and does not merely refer to a type of media and/or a supply of media.

In some examples, the particular media item specified via the media element 244 of unique ID portion 240 may be uniquely identified and correspond to a particular user, such as specified via user element 246 of unique ID portion 240.

In some examples, a single unique ID may uniquely specify both a particular media item and a particular user, and even in some cases, a particular imaging job.

In some examples, the unique ID portion 240 comprises a control portion element 250 by which the job ticket 230 may specify which control portion (e.g. 110) among a plurality of control portions may engage the job ticket 230. In some such examples, the job ticket 230 may prevent execution of the job ticket 230 by unauthorized entities, such as via unauthorized servers, computers, etc.

In some examples, the unique ID portion 240 of job ticket 230 comprises an imager element 252 by which the job ticket 230 may specify which imager from among a plurality of imagers may engage the job ticket 230 and fulfill the imaging job 200. In some such examples, the imager element 252 of the unique ID portion 240 of the job ticket 230 may prevent execution of the job ticket 230 by unauthorized particular imagers and/or unauthorized types of imagers.

In some examples, the tracking portion 260 of the job ticket 230 may track various information, behaviors, events associated with imaging via the job ticket 230. In some examples, any or all of the information associated with job ticket 230 may be accessible by and/or at least partially controlled by or via control portion 110. It will be understood that the term tracking in at least this context encompasses updating the job ticket 230 with information which has changed (e.g. new, modified, deleted) per tracking portion 260. Moreover, to the extent that the control portion 110 may have access and/or control over the job ticket 230, then such updated information per tracking portion 260 may be updated at the control portion 110.

In some examples, the tracking portion 260 may comprise a unique ID parameter 261, imager performance element 262, a content element 264, user behavior element 266, a unique ID element 268, and a log element 269.

In some examples, the unique ID parameter 261 of the tracking portion 260 may track any one, or a combination of, the various elements 242, 244, 246, 248, 250, 252 of the unique ID portion 240 of the job ticket 230 with regard to activity with or by a particular imager, media, user, etc.

In some examples, the imager performance element 262 of tracking portion 260 may track performance of a particular imager(s) generally and/or in relation to a particular imaging job (e.g. 200 in FIG. 3).

In some examples, the content element 264 of tracking portion 260 may track any changes to content of an imaging job, such as inclusion of user-provided or created information, whether such information is elicited by control portion 110 and/or volunteered by a user/participant associated with a particular media 135 being imaged.

In some examples, via user behavior element 266, tracking portion 260 of job ticket 230 may track user behavior information in relation to a particular imager and/or particular media, such as before, during, and/or after execution of an imaging job. Such information may be determined via user interaction or non-interaction with a particular imager(s) and/or a particular media, either of which is identifiable via at least a unique ID.

In some examples, tracking portion 240 of job ticket 230 may track the various implementations and changes of unique ID per the unique ID elements 242-250 of unique ID portion 240.

In some examples, via a log element 269, the tracking portion 240 of job ticket 230 may maintain a log of tracked information per elements 262, 264, 266, 268, etc. and/or activity, changes, etc. associated with at least one of the unique IDs (per elements 242, 243, 244, 246, 250) in association with unique ID portion 240 of job ticket 230.

In some examples, job ticket 230 may comprise imaging job portion 270 and/or metadata portion 280. In some examples, the imaging job portion 270 may comprise at least a portion of the content and/or formatting of imaging job 200 (FIG. 3). As noted elsewhere, content of the imaging job portion 270 in job ticket 270 (150 in FIGS. 1A, 1B; 200 in FIG. 3) may be updated upon a change in the imaging job 200 FIG. 3 which may occur during execution of the job ticket 230, whether in response to receipt of an unique ID 136 of a media 135 by control portion 110 or as caused by other control parameters.

In some examples, the metadata portion 280 of job ticket 230 may comprise information related to the imaging job 150, 200 but not directly comprising content or basic formatting. For example, such metadata may comprise information regarding imaging preferences, media preferences, etc. In some examples, in which a media may be used as an access card/badge, the metadata may include information such as a purpose of the access (e.g. building visit), access intentions, access history, logistical behavior during present access or previous access, etc. In some examples, metadata may comprise information obtained before, during, and/or after the imaging job. In some examples, a job ticket may be updated with at least some of the tracked metadata. In some examples, in addition to (or instead of) at least some examples of metadata as described throughout examples of the present disclosure, metadata may comprise non-user information regarding the passive e-paper media, non-user information related to the imager and performance of the imager, user information imaged as the content onto the passive e-paper media, user information not imaged onto the passive e-paper media, user behavioral information related to operation/performance of the imager, and/or information generated by response of a user to at least one query made, via the user interface, according to the job ticket.

Figure 5A:
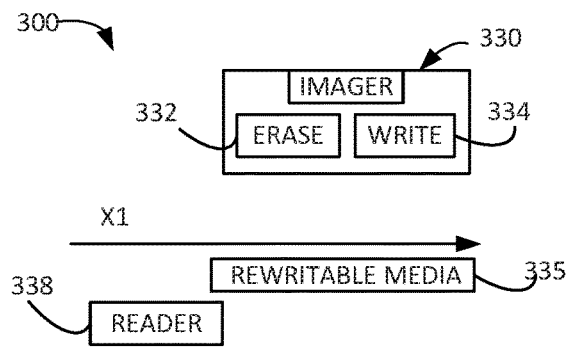
FIG. 5A is a block diagram schematically representing an example imager portion including a reader.

FIG. 5A is a block diagram 300 schematically representing an example imager 330 with an example reader 338. In some examples, imager 330 with reader 338 may comprise one example implementation of imager 130 with read portion (R) in FIGS. 1A-2C and/or may comprise at least some of substantially the same features and attributes of imager 130 in FIGS. 1A-2C.

In some examples, imager 330 comprises an erasing head 332 to erase any prior image(s) on rewritable media 335 and a writing head 334 to write a new image on rewritable media 335. In some examples, reader 338 may read data from some portions of rewritable media 335. In some examples, such as when rewritable media 335 may be implemented via a media device 350 of FIG. 5B, the data read via reader 338 may comprise an unique ID 356 from a non-rewritable portion of media device 350 with the unique ID identifying the particular media device 350. As noted in association with at least FIG. 4, such unique ID may be specified and/or tracked via a job ticket 230 and may (or may not) be associated with a particular user.

Figure 5B:
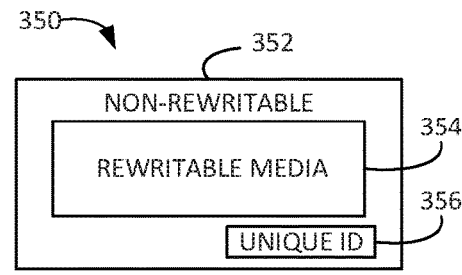
FIG. 5B is a block diagram schematically representing an example rewritable media including a unique ID.
Figure 6:
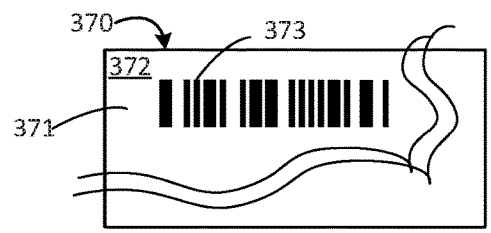
FIG. 6 is a block diagram schematically representing an example media including a portion comprising a bar code.

In some examples, the media device 350 in FIG. 5B (for use with imager 330/reader 228) may be implemented as an example media device 370 as shown in FIG. 6 in which the non-rewritable portion 372 comprises a machine readable element, such as a bar code, QR code, etc., to store the unique ID 356 (FIG. 5B) readable via reader 338 (FIG. 5A).

Figure 7:
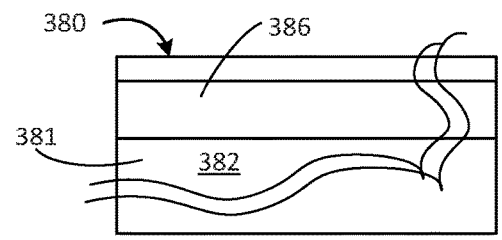
FIG. 7 is a block diagram schematically representing an example media including a portion comprising a magnetic stripe.

In some examples, the media device 350 in FIG. 5B (for use with imager 330/reader 228) may be implemented as an example media device 380 shown in FIG. 7 in which the non-rewritable portion 382 comprises a machine readable element, such as a magnetic stripe 386, to store the unique ID 356 (FIG. 5B) readable via reader 338 (FIG. 5A).

Figure 8A:
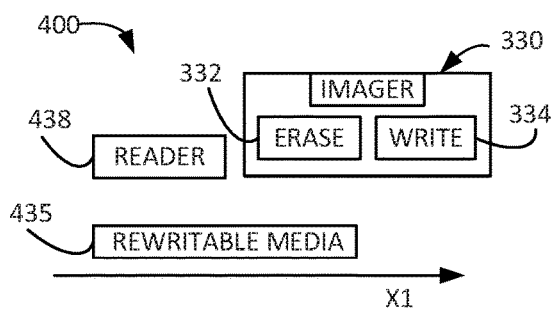
FIG. 8A is a block diagram schematically representing an example imager portion including a reader.
Figure 8B:
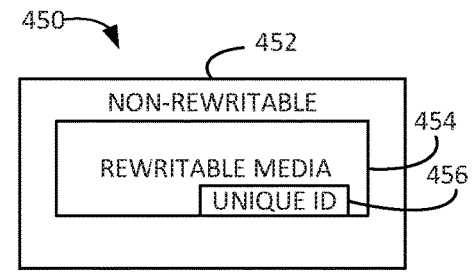
FIG. 8B is a block diagram schematically representing an example rewritable media including a rewritable unique ID.

FIG. 8A is a block diagram schematically representing an example imager portion 400 including an imager 330 and a reader 438. In some examples, imager portion 400 may comprise at least some of substantially the same features and attributes as imager portion 300 in FIG. 5A, except with reader 438 being configured to read a unique ID 456 on a rewritable portion 454 of a rewritable media device 450 instead of the unique ID 356 on a non-rewritable portion 352 as in the arrangement of at least FIGS. 5A-7. In some examples, the at least the rewritable portion 454 of media device 450 of FIG. 8B may be implemented via the passive e-paper assembly 500 of FIG. 9 while the imager 330 of at least FIG. 8A may be implemented via the imager 510 in FIG. 9, as further described below.

Figure 9:
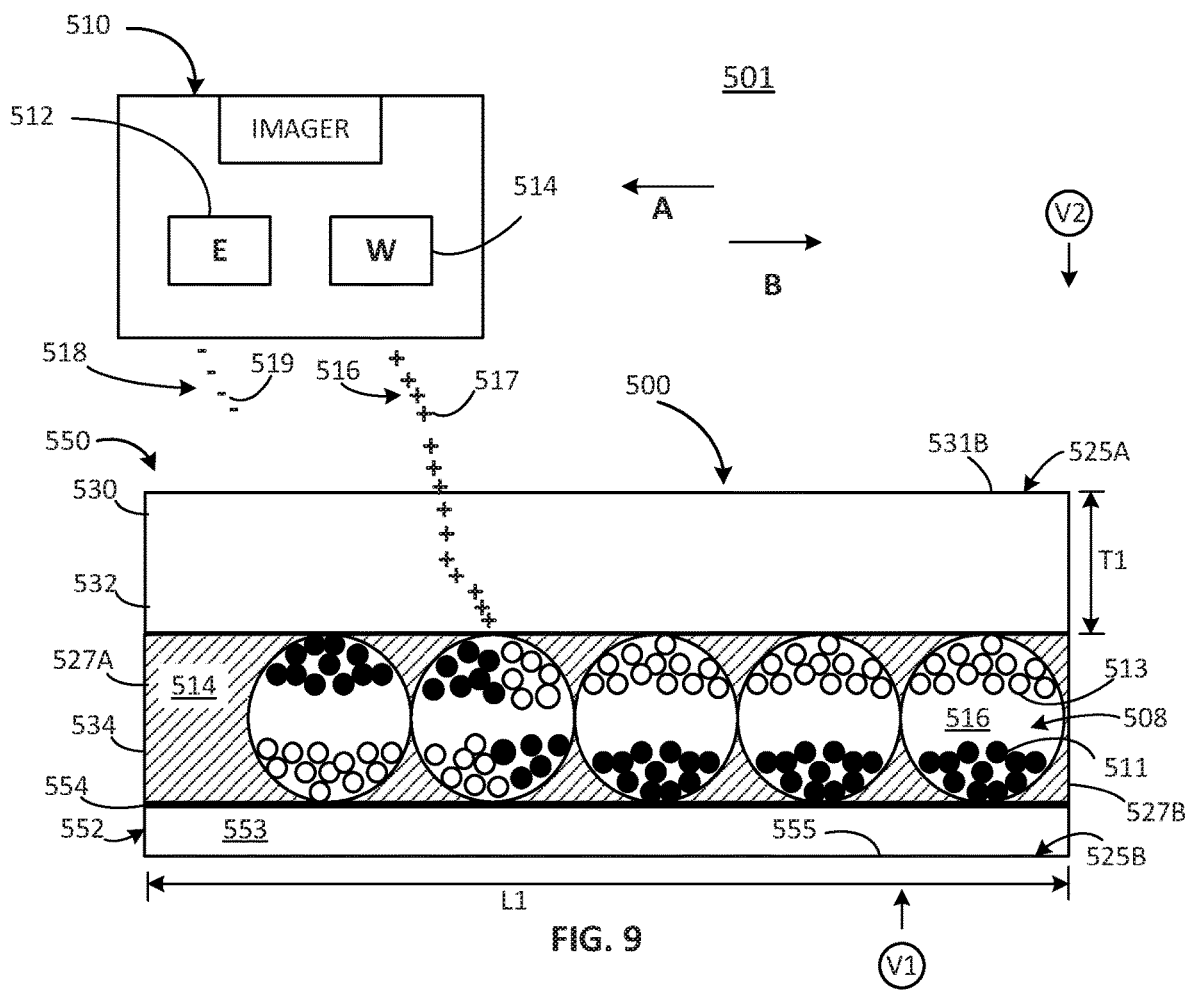
FIG. 9 is diagram including a block diagram and side view to schematically representing an example imager in non-contact relation with an example passive e-paper media.

FIG. 9 is diagram 501 including a cross-sectional view schematically representing one example e-paper assembly 500 and a side plan view schematically representing an example imager unit 510. In some examples, the passive e-paper assembly 500 comprises one example implementation of the rewritable media 354 of FIGS. 5A-5B and 454 of FIGS. 8A-8B.

As shown in FIG. 9, e-paper assembly 500 comprises an airborne-charge receiving layer 530, charge-responsive media layer 534, and counter electrode layer 552.

In some examples, the external surface 555 of counter electrode layer 552 comprises a viewing side 525B of the e-paper assembly 500 as represented by the directional arrow V1. Meanwhile, external surface 531B of airborne-charge receiving layer 530 provides the surface at which charges are applied (e.g. an imaging surface) for e-paper assembly 500.

As shown in FIG. 9, in some examples the charge-responsive media layer 534 includes microcapsules 508 encapsulated by a resin or polymer 514. In one example, each microcapsule 508 includes black particles 511 and white particles 513 suspended in a fluid medium 516.

In some examples, when held in a viewing position, ambient light is transmitted through a transparent (or translucent) counter electrode layer 552, strikes microcapsules 508, and is reflected back to the viewer V1. In instances in which white particles 513 of a microcapsule 508 are located near counter electrode layer 552, the respective microcapsule 508 appears white to a viewer V1. However, when black particles 511 of a microcapsule 508 are located near counter electrode layer 552, the respective microcapsule 508 appears black to the viewer V1. The particles 511 and 513 have opposite charges. For example, black particles 511 can be positively charged particles, and white particles 513 can be negatively charged particles, such that when ions (e.g. positive or negative charges) are written to the charge-responsive media layer 534, the respective particles 511, 513 respond according to the respective attractive or repelling forces. Various shades of gray can be created by varying the arrangement of alternating microcapsules with white and black particles located near counter electrode layer 552 to produce halftoning.

With this in mind, as further shown in FIG. 9, an imager unit 510 comprises an erasing head 512 and a writing head 514. In some examples, the respective heads 512, 514 may comprise an ion-based technology, which generates charges from a corona and emits the charges, via an individually addressable electrode array, in a selectable pattern toward the charge receiving layer 530. In some examples, other energy sources may be used to generate the ions, e.g. positive and/or negative charges.

The imager unit 510 and e-paper assembly 500 are arranged for relative movement to each other. For instance, the e-paper assembly 500 may be movable relative to a fixed imager unit 510 or the imager unit 510 may be movable relative to an e-paper assembly 500 in a temporarily fixed position. The imager unit 510 is spaced apart from the external surface 531B of charge responsive layer 530, such that charges emitted from imager unit 510 travel airborne to first side 531B of charge responsive layer 530. In the particular example shown in FIG. 9, the imager unit 510 is shown moving in direction A (when e-paper assembly 500 is fixed) or the e-paper assembly 500 media is shown moving in direction B (when imager unit 510 is fixed). During such relative movement, in some examples the erasing head 512 emits a plurality 518 of negative charges 519 onto charge receiving layer 530 to erase any prior image held by the media layer 534. Then the writing head (W) 514 emits a plurality 516 of positive charges 517 in a selectable pattern (e.g. via an addressable electrode array) onto charge-receiving layer 530. In general, a sufficient number of the charges 517 migrate through the charge-receiving layer 530 such that the charges affect the distribution of the black and white particles 511, 513 within microcapsules 508 at selected positions of an array of microcapsules. In the example shown, because the black particles 511 are positively charged, they are repelled away from the positive charges applied at charge receiving layer 530 while the white particles 513 (which are negatively charged) are attracted to the positive charges applied to the charge receiving layer 530. As a result, the black particles 511 in the selected microcapsules 508 form an image viewable from side 525B, as represented by the directional arrow V1.

In some examples, as represented by the directional arrow V2, the surface 531B at the charge receiving layer 530 may comprise the viewing surface/side of the e-paper assembly 500. Accordingly, in such examples, the charge receiving layer 530 comprises both the imaging side of the e-paper assembly 500 and the viewing side of the e-paper assembly 500.

In some examples, the black particles 511 can be negatively charged particles, and white particles 513 can be positively charged particles. In some such examples, the polarity of the respective erasing and writing heads 512, 514 of the imaging unit 510 may be reversed.

Microcapsules 508 exhibit image stability using chemical adhesion between particles and/or between the particles and the microcapsule surface. For example, microcapsules 508 can hold text and images indefinitely without using electricity, while allowing the text or images to be changed later.

In some examples, the diameter of each microcapsule 508 is substantially constant within layer 534 and can be in one example between 20 μm and 100 μm, such as 50 μm. In some examples, at least a portion of counter electrode layer 552 can be composed of a transparent conductive material, such as indium tin oxide, or an opaque material.

E-paper assembly 500 may have a variety of other configurations. In some examples, each microcapsule 508 may include black particles suspended in a white colored fluid. The black particles can be positively charged particles or negatively charged particles. One or more microcapsules form a pixel of black and white images displayed on e-paper assembly 500. The black and white images are created by placing black particles near or away from counter electrode layer 552 (when surface 555 is the viewing side −V1) or from charge receiving layer 530 (when surface 531B is the viewing side −V2). For example, microcapsules 508 having black particles 511 located away from counter electrode layer 552 reflect white light, corresponding to a white portion of an image displayed on e-paper assembly 500 as viewable on a first viewing side V1. In contrast, the microcapsules with black particles located near counter electrode layer 552 appear black to a viewer V1 corresponding to a black portion of the image displayed on e-paper display 500. Various shades of gray can be created by using halftoning with black particles located near or away from counter electrode layer 552.

Figure 10:
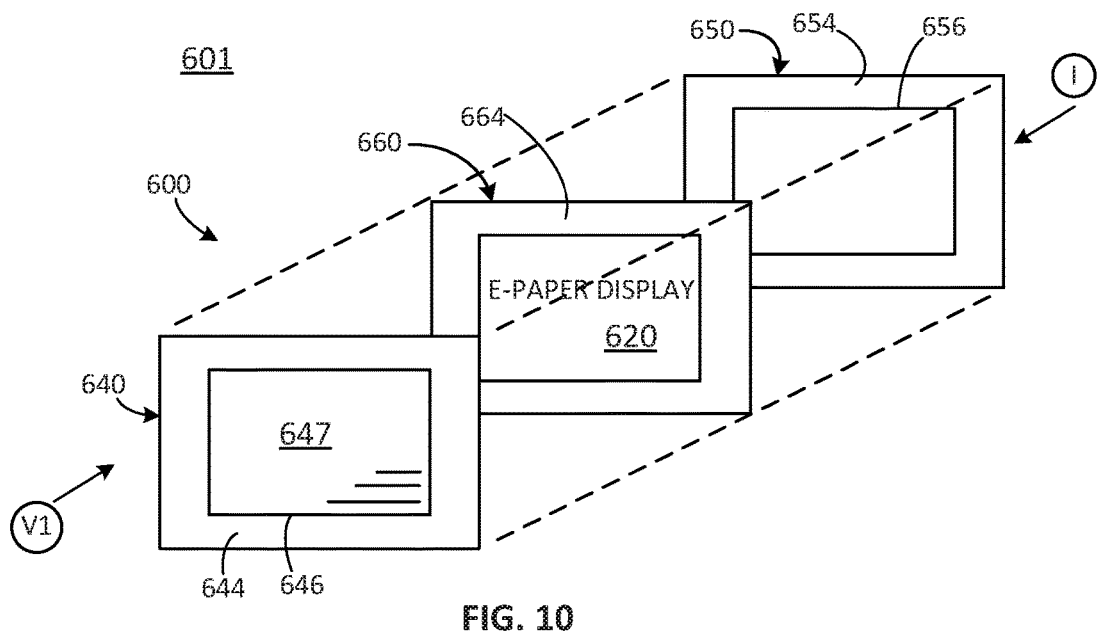
FIG. 10 is diagram including an isometric view schematically representing an example passive e-paper display device.

FIG. 10 is a diagram 601 including an exploded view schematically representing an example a passive e-paper display device 600. As shown in FIG. 10, in some examples display device 600 may comprise support members 640, 650, 660 which are formed about and/or secured relative to an e-paper display 620 (e.g. e-paper assembly 500 in FIG. 9). In one aspect, such arrangements may facilitate the passive e-paper display 620 to function as a gift card, employee badge, display card, transaction medium, etc. In some examples, one support member 660 comprises a frame 664 formed about and/or on the edges of the passive e-paper display 620. In some examples, support member 660 may be further sandwiched between a first outer support member 640 and a second outer support member 650, as shown in FIG. 10. The first outer support member 640 comprises a frame 644 defining a window 646 holding a transparent member 647 through which the passive e-paper display 620 is visible and viewable as represented via indicator V1. The second outer support member 650 comprises a frame 654 defining a window 656 through which a charge receiving layer 530 of the passive e-paper display 620 will be accessible for imaging via an imager unit (e.g. 130 in FIGS. 1A-2C, 330 in FIGS. 5A, 8A, and 510 in FIG. 9), as represented via indicator I.

Upon securing the respective support members 640, 660, 650 relative to each other, a single e-paper display device 600 provides a relatively thin, flexible e-paper display media which may enable robust use and handling in a wide variety of conditions while retaining high quality images on e-paper display 620. The e-paper display device 600 is configured to cooperate with an imager unit (e.g. 130 in FIGS. 1A-2C, 330 in FIGS. 5A, 8A, and 510 in FIG. 9) while still being usable and handled like any common gift card, identification card, access badge, etc. As such, the e-paper display device 600 is highly flexible, thin, light and resistant to wear, impact, etc.

FIG. 11 is top plan view schematically representing an example e-paper display device 670. In some examples, the e-paper display device 670 comprises an e-paper assembly 680 supported via support frame (e.g. 644 and/or 664 in FIG. 10). In some examples, e-paper assembly 680 comprises at least some of substantially the same features and attributes as the example e-paper assembly 500 (FIG. 9). As represented in FIG. 11, the support frame is a non-imageable (e.g. non-rewritable) support frame in that it does not embody re-writing images in the manner previously described for the example e-paper assembly 500. However, this does not preclude support frame (e.g. 444) from bearing images (e.g. text, graphics, photos) printed via non-e-paper technologies. In some examples, the non-imageable support frame may bear a unique ID to uniquely identify the media, e.g. the example e-paper display device 670.

FIG. 11 also schematically represents at least some of the types of information which can form part of an image 681 on an e-paper assembly 680. For instance, image 681 may comprise text 682, such as alphanumeric expressions like names, numbers, etc. In some instances, image 681 may comprise machine readable markings 684, such as a bar code or QR code.

In some examples, the machine readable markings 684 may serve as a unique ID for the particular media device 670, such as a media unique ID as previously described in association with at least media element 244 of unique ID portion 240 of job ticket 230. In some such examples, such unique ID may be rewritable such that the unique ID may be changed during or after execution of an imaging job (e.g. 200 in FIG. 3) as directed according to a job ticket 230. In such instances, the updated unique ID may be updated on the job ticket 230, which is then later communicated to or retrieved by the control portion 110 (FIGS. 1A, 1B).

In some examples, updating the unique ID on the job ticket 230 with respect to a particular media item (for which the unique ID was changed) may enable more secure use of the particular media item because the next time an imager engages the particular media device, it will have a different unique ID. In one aspect, this arrangement may hinder attempts to employ counterfeit media devices in imagers and/or for access to buildings, offices, etc.

However, it will be understood from at least some other examples, a unique ID associated with a particular media item is not rewritable, and as such may be provided on a non-rewritable portion of the particular media item.

In some instances, image 681 may comprise a photo 686 and/or a graphic 688. In some such examples, the photo 686 may correspond to a photo of a person or an authentication object (e.g. trees, mountains, animal, etc.) when media device 670 is used for identification, access, etc. In some examples, like the above-described unique ID which may be changed to enhance security, the photo 686 and/or graphic 688 may be changed in some instances to enhance security and/or for other purposes.

In some examples, media device 670 may comprise a unique ID 689 on a non-imageable support frame (e.g. non-rewritable portion) 644 and/or 664, which may be present instead of, or in addition to, markings 684 when markings 84 serve as a unique ID. In some such examples, the unique ID 689 may be the same as the unique ID in markings 684, except in some examples in which the unique ID of markings 684 is rewritten. In some examples, unique ID 689 may be different than the unique ID of markings 684, such as when unique ID 689 represents a different type or instance of information than the unique ID embodied in markings 684.

FIG. 12A is a block diagram schematically representing an example control portion 860. In some examples, control portion 860 provides one example implementation of the control portion 110 (FIGS. 1A, 1B) and/or a control portion forming a part of, implementing, and/or managing any one of the devices, imagers, imaging stations, readers, user interfaces, instructions, engines, functions, parameters, and/or methods, as described throughout examples of the present disclosure in association with FIGS. 1A-11 and 13-14.

In some examples, control portion 860 includes a controller 862 and a memory 870. In general terms, controller 862 of control portion 860 comprises at least one processor 864 and associated memories. The controller 862 is electrically couplable to, and in communication with, memory 870 to generate control signals to direct operation of at least some the devices, imagers, imaging stations, readers, user interfaces, instructions, engines, functions, parameters, and/or methods, as described throughout examples of the present disclosure. In some examples, these generated control signals include, but are not limited to, employing instructions 481 stored in memory 870 to at least direct and manage imaging media in association with a job ticket in the manner described in at least some examples of the present disclosure. In some examples, at least some instructions 871 are implemented via manufacturing engine 1000 in FIG. 13.

In response to or based upon commands received via a user interface (e.g. user interface 480 in FIG. 12B) and/or via machine readable instructions, controller 862 generates control signals to implement imaging a media in association with a job ticket in accordance with at least some of the examples of the present disclosure. In some examples, controller 482 is embodied in a general purpose computing device while in some examples, controller 482 is incorporated into or associated with at least some of the devices, imagers, imaging stations, readers, user interfaces, instructions, engines, functions, parameters, and/or methods, etc. as described throughout examples of the present disclosure.

For purposes of this application, in reference to the controller 862, the term "processor" shall mean a presently developed or future developed processor (or processing resources) that executes sequences of machine readable instructions contained in a memory. In some examples, execution of the sequences of machine readable instructions, such as those provided via memory 870 of control portion 880 cause the processor to perform actions, such as operating controller 862 to implement imaging media in association with a job ticket as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium), as represented by memory 870. In some examples, memory 870 comprises a computer readable tangible medium providing non-volatile storage of the machine readable instructions executable by a process of controller 862. In other examples, hard wired circuitry may be used in place of or in combination with machine readable instructions to implement the functions described. For example, controller 862 may be embodied as part of at least one application-specific integrated circuit (ASIC). In at least some examples, the controller 862 is not limited to any specific combination of hardware circuitry and machine readable instructions, nor limited to any particular source for the machine readable instructions executed by the controller 862.

Figure 14:
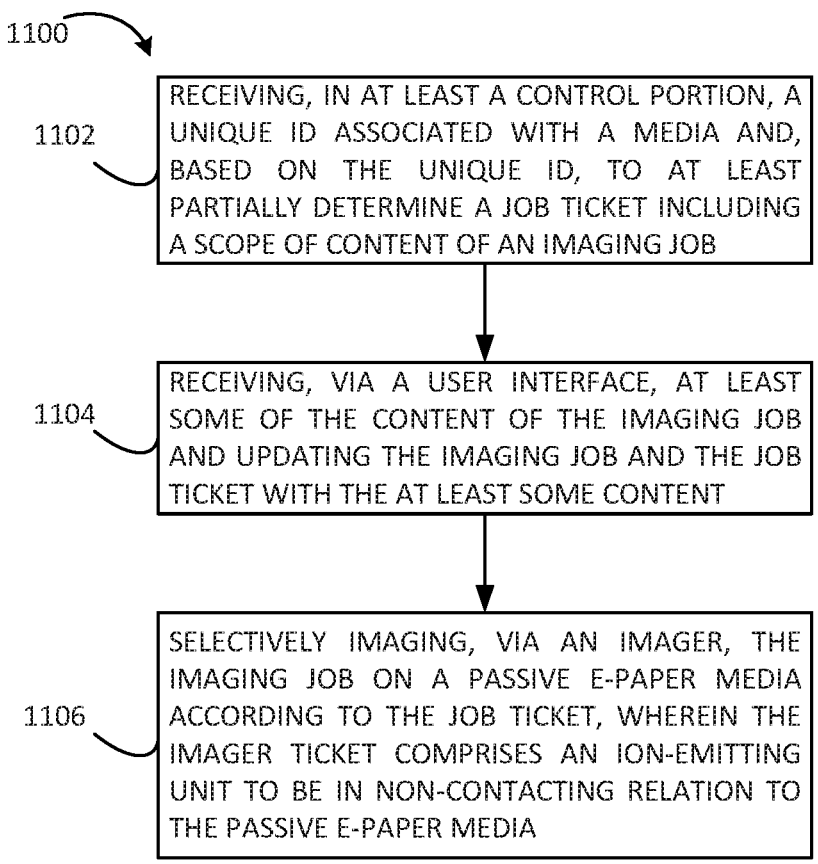
FIG. 14 is a flow diagram schematically representing an example method.

In some examples, control portion 860 may be entirely implemented within or by a stand-alone device, which has at least some of substantially the same features and attributes as device 100 (or portions thereof) as previously described in association with at least FIGS. 1A-11 and at least FIGS. 13-14.

In some examples, the control portion 860 may be partially implemented in the device 100 and partially implemented in a computing resource separate from, and independent of, the device 100 but in communication with the device 100. For instance, in some examples control portion 860 may be implemented via a server accessible via the cloud and/or other network pathways. In some examples, the control portion 860 may be distributed or apportioned among multiple devices or resources such as among a server, an imager, and/or a user interface.

In some examples, control portion 860 includes, and/or is in communication with, a user interface 880 as shown in FIG. 12B. In some examples, user interface 880 comprises a user interface or other display that provides for the simultaneous display, activation, and/or operation of at least some of the devices, imagers, imaging stations, readers, user interfaces, instructions, engines, functions, parameters, and/or methods, etc. as described in association with FIGS. 1A-11 and 13-14. In some examples, at least some portions or aspects of the user interface 880 are provided via a graphical user interface (GUI), and may comprise a display 884 and input 882.

In some examples, at least some of the features of user interface 120 in association with at least FIGS. 1A-2C, 4 may comprise one example implementation of user interface 880, and each of the user interfaces 120 (FIGS. 1A-2C, 4) may comprise at least some of substantially the same features and attributes as user interface 880 in FIG. 12B.

FIG. 13 is a block diagram schematically representing an example imaging control engine 1000. In some examples, the imaging control engine 1000 directs and manages imaging a media in association with a job ticket, as well as performing related tasks. In some examples, imaging control engine 1000 provides at least some example implementations of instructions 871 in memory 870 associated with control portion 860 (FIG. 12A) and/or some example implementations of control portion 110 (FIGS. 1A, 1B).

In some examples, imaging control engine 1000 provides one example by which at least some examples described in association with at least FIGS. 1A-12B and 14 may be implemented.

As shown in FIG. 13, in some examples imaging control engine 1000 comprises job ticket engine 1010, imaging job engine 1030, imager engine 1050, and user interface engine 1060.

In general terms, job ticket engine 1010 provides control over the scope and operation of a job ticket comprising at least some of features and attributes as previously described in association with at least some examples throughout the present disclosure, such as but not limited to, job ticket 140, 230 in association with at least FIGS. 1A-1B, 4, respectively. In some examples, job ticket engine 1010 comprises a unique ID function 1015 which may control execution and use of the unique ID portion 240 of job ticket 230, as previously described in association with at least FIG. 4. In some examples, unique ID function 1015 comprises media parameter 1016, imaging job parameter 1017, other parameter 1018 which may correspond to and/or provide control over at least media element 244, imaging job element 242, and other parameters (246, 250) as previously described in association with at least FIG. 4.

In some examples, the tracking function 1020 of job ticket engine 1010 may control execution and use of the tracking portion 260 of job ticket 230 in FIG. 4.

In some examples, the imaging job function 1022 of job ticket engine 1010 may control execution and use of the imaging job portion 270 of job ticket 230 in association with at least FIG. 4. In some examples, the metadata function 1024 of job ticket engine 1010 may control execution and use of the metadata portion 280 of job ticket 230 in association with at least FIG. 4.

In general terms, imaging job engine 1030 provides control over the scope and operation of an imaging job comprising at least some of features and attributes as previously described in association with at least some examples throughout the present disclosure, such as but not limited to, imaging job 150, 200 in association with at least FIGS. 1A-1B, 3, respectively. In some examples, imaging job engine 1030 comprises content parameter 1032, formatting parameter 1034, and unique ID parameter 1036 which may correspond to and/or provide control over at least content element 202, formatting element 204, and unique ID element 206, as previously described in association with at least FIG. 3 and throughout the present disclosure.

In some examples, imager engine 1050 may provide control over and/or information gathering regarding an imager in at least the manner previously described in association with at least some of the features and attributes as previously described in association with the example imagers 130 (FIGS. 1A-2C), 330 (FIGS. 5A, 8A), 510 (FIG. 9).

In some examples, user interface engine 1060 may provide control over and/or information gathering regarding an user interface in at least the manner previously described in association with at least some of the features and attributes as previously described in association with the example user interfaces 120 (FIGS. 1A-2C), 880 (FIG. 12B), etc.

With respect to at least the various engines and functions (and their respective parameters) represented within FIG. 13, it will be understood that in at least some examples the various engines, functions, parameters, etc. may be arranged differently (e.g. in different groupings, combinations, separated, etc.) than shown in imaging control engine 1000 of FIG. 13 while still implementing the actions, arrangements, features, attributes, etc. as previously described in association with at least FIG. 13 and/or as described throughout at least some of the examples of the present disclosure. Similarly, with respect to at least the various imaging jobs, job tickets (and their respective elements, parameters, functions) represented in the Figures (e.g. FIGS. 3-4), it will be understood that in at least some examples the various elements, functions, parameters, etc. may be arranged differently (e.g. in different groupings, combinations, separated, etc.) than shown in those Figures while still implementing the actions, arrangements, features, attributes, etc. as previously described in association with at least the current representation in FIGS. 3-4 and other Figures, and/or as otherwise described throughout at least some of the examples of the present disclosure FIG. 14 is a flow diagram schematically representing an example method. In some examples, method 1100 may be performed via at least some of the imaging stations, job tickets, media, devices, control portion, user interface, functions, parameters, receiving user-created information at an user interface as previously described in association with at least FIGS. 1A-13. In some examples, method 1100 may be performed via at least some imaging stations, job tickets, media, devices, control portion, user interface, functions, parameters other than those previously described in association with at least FIGS. 1A-13.

As shown in FIG. 14, in some examples at 1102 method 1100 comprises receiving, in at least a control portion, a unique ID associated with a media and, based on the unique ID, to at least partially determine a job ticket including a scope of content of an imaging job. In some examples, at 1104 method 1100 comprises receiving, via a user interface, at least some of the content of the imaging job and updating the imaging job and the job ticket with the at least some content. In some examples, at 1106 method 1100 comprises selectively imaging, via an imager, the imaging job on a passive e-paper media according to the job ticket, wherein the imager comprises an ion-emitting unit to be in non-contact relation to the passive e-paper media.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A device comprising:
an imager to selectively image media as an imaging job in association with a job ticket, wherein the imager is separate from and independent of the media; and
a control portion to at least receive a unique ID associated with the media and, based on the unique ID, to at least partially determine the job ticket and to at least partially determine a scope of content of the imaging job.

2. The device of claim 1, comprising:
a user interface, in association with at least the control portion, to receive user-provided information to at least partially determine the content of the imaging job, and
wherein via communication between at least the user interface and the control portion, the control portion is to update the job ticket regarding the content of the imaging job in association with the user-provided information.

3. The device of claim 2, wherein in response to receiving the unique ID, the control portion is to at least partially determine a user interaction profile at the user interface by which the user-provided information is received.

4. The device of claim 1, comprising:
an imaging station comprising the imager, wherein the user interface is communication with the imager and is at least one of:
part of the imaging station;
separate from the imaging station; and
remote from the imaging station.

5. The device of claim 1, wherein the media comprises a rewritable media and the imager is to selectively erase and write content on the media.

6. The device of claim 5, wherein the rewritable media comprises a passive e-paper media and the imager comprises a non-contact ion-emitting unit.

7. The device of claim 5, wherein the rewritable media comprises a machine-readable medium storing the unique ID.

8. The device of claim 7, wherein the control portion is to cause a reader at the imager to read the unique ID on the media and to update the job ticket with the unique ID of the rewritable media.

9. The device of claim 7, wherein the control portion is to exclusively associate the at least one uniquely identifiable media with the job ticket.

10. The device of claim 7, wherein the rewritable media comprises:
- a non-rewritable frame portion on which the unique identifier is present prior to presentation to the imager; and
- a rewritable portion supported via the frame portion and at which the content may be erased and written via the imager.

11. The device of claim 1, the control portion to perform at least one of:
- determination, via at least one of the user interface and the imager, of user behavior information at the imager before, during and/or after printing, and to update the job ticket with the user behavior information; and
- collection of performance information regarding operation of the imager and to cause updating of the job ticket with the performance information.

12. A device comprising:
- an imager comprising a non-contact ion-emitting unit to selectively image a passive e-paper media as an imaging job in association with a job ticket; and
- a control portion to manage a job ticket, including to at least receive a unique ID associated with the media and, based on the unique ID, to at least partially determine the job ticket and to at least partially determine the content of the imaging job.

13. The device of claim 12, comprising:
- a user interface, in association with at least the control portion, to receive user-provided information to provide at least some of the content of the imaging job and to become part of the job ticket.

14. A method comprising:
- receiving, in at least a control portion, a unique ID associated with a media and, based on the unique ID, to at least partially determine a job ticket including a scope of content of an imaging job;
- receiving, via a user interface, at least some of the content of the imaging job and updating the imaging job and the job ticket with the at least some content; and
- selectively imaging, via an imager, the imaging job on a passive e-paper media according to the job ticket, wherein the imager comprises an ion-emitting unit to be in non-contact relation to the passive e-paper media.

15. The method of claim 14, comprising:
- determining, via at least one of the user interface and the imager, user behavior information at the imager before, during and/or after printing, and to update the job ticket with the user behavior information; and
- collection of performance information regarding operation of the imager and to cause updating of the job ticket with the performance information.

* * * * *